United States Patent
Hollox et al.

[15] 3,661,599
[45] May 9, 1972

[54] HIGH TEMPERATURE TIC-VC STRUCTURAL MATERIALS

[72] Inventors: Graham E. Hollox, Baltimore; Walter Precht, Towson; Robert G. Lye, Towson; Albert R. C. Westwood, Towson, all of Md.

[73] Assignee: Martin Marietta Corporation, New York, N.Y.

[22] Filed: Mar. 25, 1969

[21] Appl. No.: 810,301

[52] U.S. Cl. ............................106/43, 23/301, 29/182.7, 29/191.2, 75/203, 264/29
[51] Int. Cl. ..........................................C04b 35/52
[58] Field of Search ................106/43; 29/182.7, 191.2; 264/29; 75/10, 203; 148/1.6; 23/301 SP, 273 SP, 301, 208

[56] References Cited

UNITED STATES PATENTS

| | | | |
|---|---|---|---|
| 2,076,366 | 4/1937 | Cooper | 106/43 X |
| 2,356,009 | 8/1944 | Schwarzkopf | 106/43 X |
| 3,030,194 | 4/1962 | Emeis | 75/10 X |
| 3,389,987 | 6/1968 | Lebek et al. | 75/10 |
| 3,419,415 | 12/1968 | Dittkich | 106/43 X |
| 3,419,656 | 12/1968 | Riley et al. | 106/43 X |
| 3,488,157 | 1/1970 | Koffer | 23/273 |
| 3,498,846 | 3/1970 | Keller | 148/1.6 |
| 3,507,616 | 4/1970 | Tobin et al. | 23/208 |
| 3,525,594 | 8/1970 | Barrett | 23/273 |

OTHER PUBLICATIONS

Schwarzkopf, P., et al.; Refractory Hard Metals, New York, 1953 pp. 182– 185. [ TN677536]
Kingery, W. D.; Ceramic Fabrication Processes, New York, 1958, p. 154. (TP807K5)

*Primary Examiner*—James E. Poer
*Assistant Examiner*—W. R. Satterfield
*Attorney*—James B. Eisel and Gay Chin

[57] ABSTRACT

The invention describes new high temperature structural materials consisting of titanium carbide vanadium carbide alloys produced by zone refining techniques. The materials are fully dense and may be either mono- or polycrystalline.

6 Claims, 2 Drawing Figures

INVENTORS
GRAHAM E. HOLLOX
WALTER PRECHT
ROBERT G. LYE
ALBERT R.C. WESTWOOD

HIGH TEMPERATURE TIC-VC STRUCTURAL MATERIALS

This invention is directed to novel alloys of titanium carbide and vanadium carbide, produced by zone refining techniques, further characterized in that they are fully dense, single phase materials.

In high temperature structural applications, many conventional materials such as steels or aluminum-base alloys are useless because the temperatures of exposure are such that the alloys are molten, or have extremely poor mechanical properties. Consequently, new materials are required for a variety of applications including ablative surfaces and engine components. Particular advantages would derive from alloys having (i) higher operating temperatures and (ii) high strength-to-density ratios — in engine applications, this would lead to greater operating efficiency and useful thrust.

This need for improved materials for high temperature structural applications has stimulated research into the mechanical behavior of a number of materials, including the refractory carbides, borides and nitrides. Carbides are of particular interest for three reasons:

i. they include the materials exhibiting the highest melting points,
ii. they are extremely strong, and
iii. at high temperatures, they deform in a manner similar to the ductile face centered cubic materials.

The existence of solid solutions of cubic carbides has been known for many years. For a review of this work, see Schwartzkopf and Kieffer, "Refractory Hard Metals," Macmillan, New York (1955). There are many methods of making these, for example, by carbonization of metal or metal oxides. These processes produce powders of pure or alloyed carbides, and bulk samples can be produced from such by cold forming and sintering, hot pressing, or liquid phase sintering.

In U.S. Pat. No. 3,380,839, fine grain powders of the titanium carbide and vanadium carbide solid solution were prepared. These powders were formed into sintered products having densities of only 90 to 97 percent of theoretical density.

However, optimizing the properties of carbides requires fully dense materials, i.e., materials of theoretical density, with no microscopic or macroscopic porosity. Porosity gives rise to brittleness, because pores act as crack nuclei.

One objective of this invention is to produce fully dense carbide alloys.

A further object of this invention is to provide carbide alloys which are single phase and fully dense.

Another object of this invention is to provide fully dense, single phase carbide alloys which have high strength-to-density ratios.

A further object of this invention is to provide carbide alloys of very high strength at high temperatures.

In accordance with the above objects of this invention, we have found that alloyed, fully dense cubic carbides of titanium and vanadium exhibit high strengths at very high temperatures.

Figure 1:
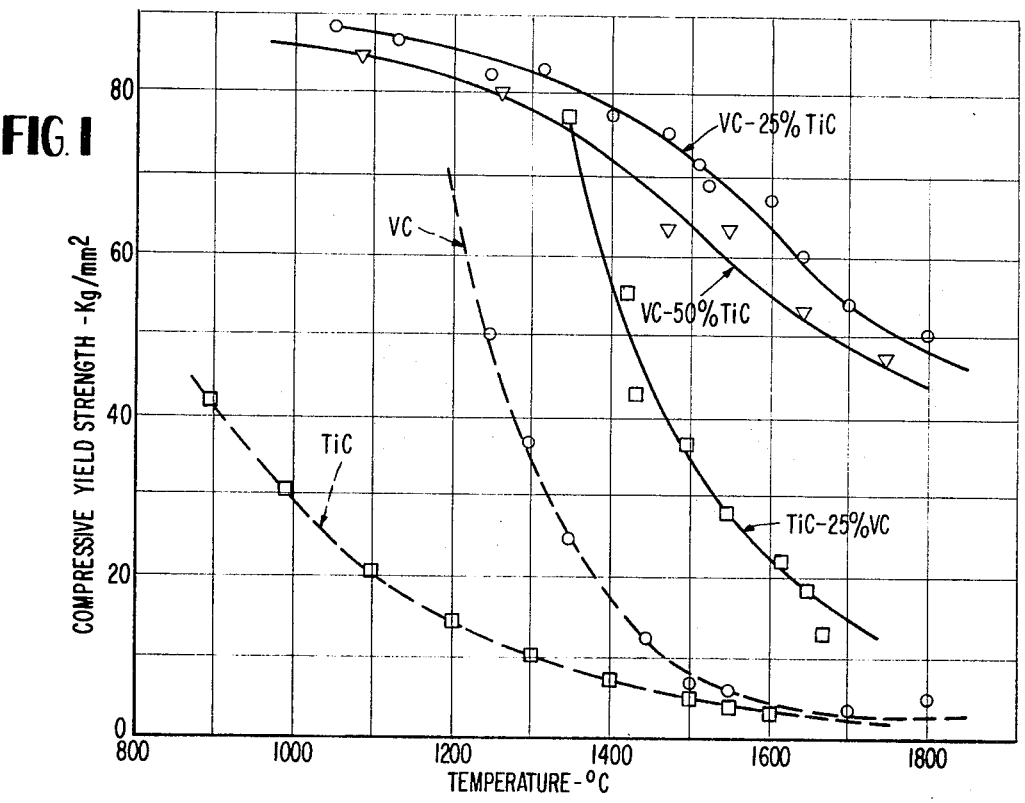
FIG. 1 is a plot of compressive Yield Strength v. Temperature for titanium carbide, vanadium carbide, and various titanium carbide, vanadium carbide (TiC-VC) alloys.

The novel products of this invention are prepared by float zone techniques which are described in the article entitled "Floating Zone Techniques for Growth of Carbide Single Crystals" by W. Precht and G.E. Hollox, Research Institute for Advanced Studies, Martin Marietta Corporation, Lepel Review, 1968, Vol. 2, No. 6, page 7, and incorporated herein by reference. Though the Precht and Hollox article is directed to describing the floating zone technique applied to the growth of vanadium carbide crystals, this technique has also been successfully applied to the titanium carbide, vanadium carbide alloys of this invention, as mentioned in the article.

Single crystals of carbides such as titanium carbide and vanadium carbide have been grown by other prior art processes. Strain-anneal techniques have produced carbides in single crystal and polycrystalline form. However, this technique does not readily lend itself to control of carbon-to-metal ratio, and has not been used for TiC-VC alloys. The solution growth technique involves forming a molten flux from which carbide single crystals are obtained. This method again does not lend itself to producing large crystals, or controlling carbon content. Another possible method for producing carbide single crystals is the plasma growth technique. Here, powders are fed through an electric arc and thereby melted, forming a molten pool from which single crystals or polycrystalline materials can be grown.

None of the above-mentioned techniques for forming single crystals are preferred herein because of their inability to provide close control of the carbon-to-metal ratio, and their inability to form large single crystals.

The preferred float zone process involves formation of a molten zone and subsequent movement of this zone along the rod. This technique has proven useful in zone refining, zone leveling and the growth of single crystals. Such is particularly important where reactive materials are involved, since extreme purity may be obtained utilizing the zone refining process. This process also has the inherent advantage that one usual source of contamination in crystal formation, namely the crucible, is eliminated, since the molten zone is passed along rods without making contact with such a container. Another advantage is that large crystals may be prepared.

The mechanical properties of the cubic carbides are strongly influenced by stoichiometry, and for this reason it is necessary to prepare crystals of various carbon-to-metal ratios. Preparing single phase crystals requires close control of carbon content. This is achieved by utilizing rods of specific starting composition, and a high pressure gas environment in the induction heating zone. In a specific embodiment, we start with commercially available powders of titanium carbide and vanadium carbide containing either stoichiometric or non-stoichiometric amounts of carbon, and adjust the composition to the single phase region. Usually available carbides contain an excess of carbon, and it is necessary to add pure metal to reduce the carbon content to within the limits of the single phase region. We have found that carbon contents of between 0.85 and 0.90 are preferred. While carbon contents for producing a single phase equilibrium material have not been fully studied, we estimate that suitable carbon contents may range from between 0.70 and 1.0.

After adjusting carbon contents, the carbide powders are blended in a wet blender, the material suspended in a mixture of water and 0.5 percent by weight of polyvinyl alcohol. The thus blended carbides are placed in trays and allowed to dry, first in air, then in an oven heated to approximately 80° C. The dried powders are granulated through 100 mesh sieve, then isostatically compacted at about 25 tons per square inch pressure into rods about 6 to 7 in. long. These rods are sintered at between 1,600° and 1,700° C., the exact temperature depending on the particular composition. The sintered rods are similar to the prior art titanium carbide, vanadium carbide alloys as disclosed in U.S. Pat. No. 3,380,839. The rods are porous, and of about 85 to 95 percent of theoretical density.

The rods are ground to uniform diameter of about 0.75 inches, and then subjected to the float zoning procedure described above. The rate at which the rod is passed through the induction heating zone may vary from as little as 0.7 cm. per hour, to obtain a single crystal, up to meters per hour to obtain a fine grain polycrystalline material.

At the high temperatures of induction heating, considerable volatization is observed. We have found it necessary, therefore, to work under 10 atmospheres pressure, to maintain control of composition and stoichiometry.

The alloys of the present invention contain from 90 to 10 percent vanadium carbide, and from 10 to 90 percent titanium carbide. Compositions prepared and studied include the following: (1) 90% VC – 10% TiC; (2) 75% VC – 25% TiC; (3) 66% VC – 34% TiC; (4) 50% VC – 50% TiC; (5) 34% VC – 66% TiC; (6) 25% VC – 75% TiC; and (7) 10% VC – 90% TiC.

These alloys are single phase and fully dense. They may be further characterized as having the cubic structure.

By fully dense material we mean a material which exhibits its theoretical density, i.e., a material having the same density as a single unit cell. These materials are non-porous. Such is distinguished from powdered products of the prior art which contain porosity. Said powdered products achieve only about 90 to 97 percent of their theoretical density, and do not exhibit the high strength of the products of this invention.

The single phase materials may be mono- or polycrystalline, depending upon the rate of zone travel in the zone refining process. The fine grained, fully dense polycrystalline carbides provide useful mechanical strength and ductility at high temperatures, and may therefore be of significant technological importance in the future.

Turning now to FIG. 1, a plot of the strength of some TiC-VC alloys as a function of temperature, both titanium carbides and vanadium carbides in the single phase region show relatively low compressive yield strengths which fall off markedly as the temperature is raised. The alloys of the invention maintain their strength to much higher temperatures. A small amount of ductility has been observed in some of these alloys at temperatures close to 1,800° F., which is below the brittle-to-ductile transition temperature of pure vanadium carbide. On the other hand, the titanium carbide – 25% vanadium carbide alloy has a considerably higher brittle-to-ductile transition temperature than the other alloys. This may be used to advantage in cutting tool applications, since blunting by plastic flow would be less likely in this alloy. The unique and unexpected properties of these alloys could not have been predicted from the behavior of the parent carbides, or from any other prior information.

Figure 2:
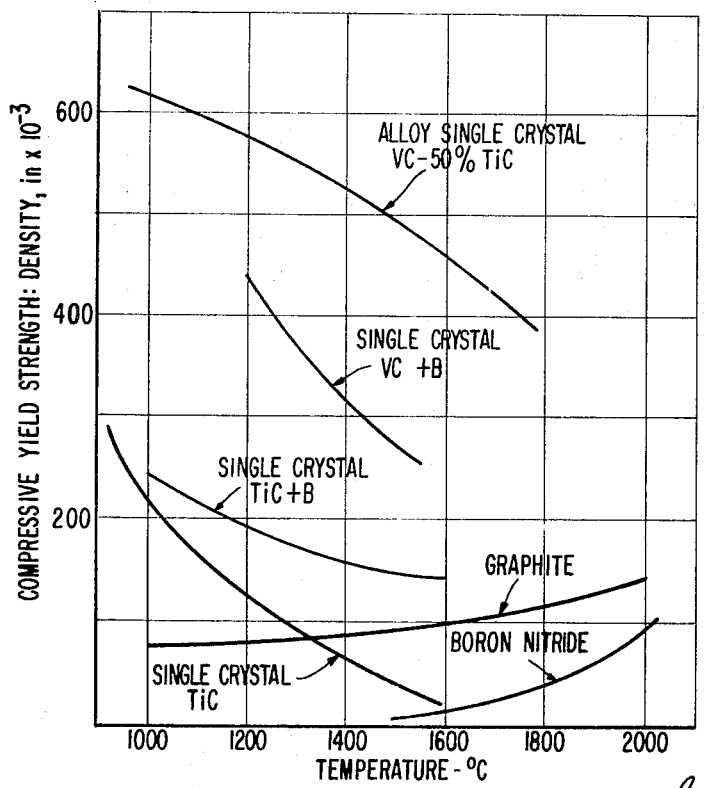
FIG. 2 is a plot of Strength-to-Density ratio of TiC–50% VC compared with other currently used high temperature structural materials as a function of temperature.

Referring to FIG. 2, a plot of the yield strength-to-density ratio v. temperature, it can be seen that the strength-to-density ratio of a vanadium carbide – 50% titanium carbide alloy is appreciably greater than other high temperature materials, emphasizing its possible use as a structural material. The data in this figure are for annealed single crystals, as opposed to engineering materials — which are normally used after precipitation hardening, work hardening or grain refining treatments.

Without wishing to be bound by the limits of current understanding, we consider that it is a combination of properties which lead to the high temperature strength of the alloys of this invention. The materials must be of controlled purity, composition and stoichiometry, and fully dense. It is believed that the absence of pores reduces the number of potential crack nuclei, resulting in much stronger products.

The addition of boron to titanium carbide increases its strength. Similarly, boron affects the strength of VC. The strength-to-density ratio of boron doped single crystals of $VC_{0.84}$ is 280,000 in. at 1,500° C. Titanium carbide, vanadium carbide alloys show values far in excess of this. In particular, that of the VC – 50% TiC alloy appears to exceed 600,000 in. at 1,000° C. It is possible that these values are greater than those of any conventional materials, and are of particular interest because they exceed the target set by the U.S. Bureau of Naval Weapons in 1964. Even so, boron doping may further increase the strength of these alloys to exceed these present high values.

The only system studied to date has been the TiC-VC system. On the basis of these observations, however, other alloys between carbides may be expected to show similar characteristics.

What is claimed is:

1. A float zone melted fully dense, single phase, crystalline TiC-VC alloy, wherein said alloy consists essentially of from 90 to 10 molar percent TiC and from 10 to 90 molar percent VC, said alloy having a C : Ti plus V atomic ratio of from 0.7 : 1 to 1.0 : 1 and a compressive yield strength of at least 20 $kg/mm^2$ at 1,600° C.

2. A float zone melted fully dense, single phase, crystalline TiC-VC alloy as a structural material having a high strength-to-density ratio at high temperature, wherein said alloy consists essentially of from 90 to 10 molar percent TiC and from 10 to 90 molar percent VC and has a C : Ti plus V atomic ratio of from 0.7 : 1 to 1.0 : 1 and a compressive yield strength of at least 20 $kg/mm^2$ at 1,600° C.

3. In a process for preparing TiC-VC alloys, in which TiC and VC powders are blended together and sintered, the improvement comprising preparing TiC-VC alloys of controlled purity, composition and stoichiometry by blending TiC and VC powders in a molar ratio of from 10 to 90% TiC and from 90 to 10% VC, adjusting the carbon content of the TiC and VC powders to an atomic ratio of C : Ti plus V of from 0.7 : 1 to 1.0 : 1 to be within the single phase region, blending the thus modified carbide powders, sintering, and then subjecting the carbides to float zone melting under 10 atm pressure, whereby the sintered material is melted and crystallized as a fully dense, crystalline TiC-VC alloy material.

4. The process of claim 3, in which the powdered material is first formed into rods, the sintered rods passed through an induction heating zone at rates varying from 0.7 cm. per hour to more than 1 meter per hour.

5. The process of claim 3, wherein said material prepared is monocrystalline.

6. The process of claim 3, wherein said material prepared is polycrystalline.

* * * * *